G. Blanchard,
Twine Cutter.
N° 15,098. Patented June 10, 1856.
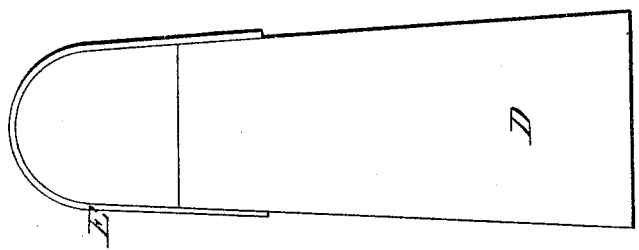
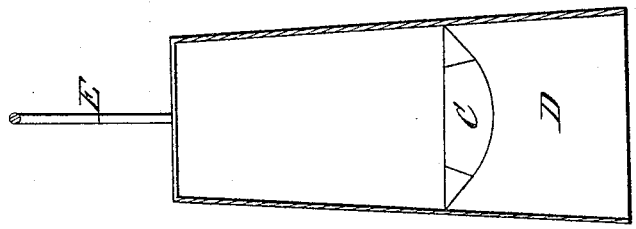
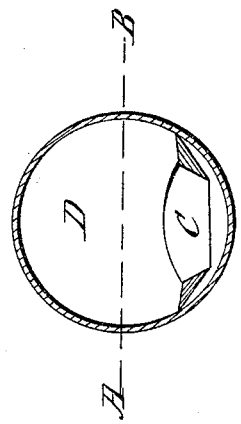

UNITED STATES PATENT OFFICE.

GEORGE BLANCHARD, OF NEW YORK, N. Y.

APPARATUS FOR CUTTING THE STRINGS THAT SECURE CORKS IN BOTTLES.

Specification of Letters Patent No. 15,098, dated June 10, 1856.

*To all whom it may concern:*

Be it known that I, GEORGE BLANCHARD, of the city of New York, in the county of New York and State of New York, have invented a new and useful Machine for Cutting Strings and Releasing Bottle-Corks; and I do hereby declare that the following is a full, clear, and exact description of the construction and operation of the same.

The nature of my invention consists in providing the internal part of the tin or metallic cup D with the cutting blade C slantingly arranged with the edge downward so as to cut the string and permit the cork to escape from the bottle and be received in the cup D.

To enable others skilled in the art to make and use my invention I will proceed to describe its construction and operation.

I construct my cup D as shown in the accompanying drawing, one inch and a half more or less at the bottom in diameter, one inch or more at the top, two inches and a half more or less in depth, the bottom of cup left open and the top closed. I also insert a cutting knife blade in the inside of the cup with the edge downward toward the open end of the cup. I fasten this blade in by means of solder or screws. I leave sufficient space between the knife C, and the inner side of the cup D.

Mode of operation: The cup to be taken in one hand and the bottle in the other, the cup then placed on the top of the cork, turn around the knife C, taking effect upon the strings, the gaseous matter in the bottle forces the cork into the upper part of the cup D, the object of this being to prevent the cork doing damage.

What I claim in my invention and desire to secure by Letters Patent is—

The internal and slanting arrangement of one or more knives inside of the cup, the knife or knives being so arranged in the cup that when the cup is put over the cork and turned that the strings are immediately cut and the cork safely received in the top of the cup.

GEORGE BLANCHARD.

Witnesses:
 NATHAN LEVY,
 JOHN JONES.